(12) United States Patent
Lam

(10) Patent No.: US 8,978,315 B2
(45) Date of Patent: Mar. 17, 2015

(54) FLANGE ASSISTANT FOR CONNECTING ADJACENT TOWER SECTIONS

(71) Applicant: Siemens Aktiengesellschaft, München (DE)

(72) Inventor: Johnny Steven Lam, Hornslet (DK)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 14/143,054

(22) Filed: Dec. 30, 2013

(65) Prior Publication Data

US 2014/0230343 A1    Aug. 21, 2014

(30) Foreign Application Priority Data

Feb. 19, 2013  (EP) .................................. 13155820

(51) Int. Cl.
*E04H 12/00* (2006.01)
*F03D 11/04* (2006.01)
*E04H 12/08* (2006.01)

(52) U.S. Cl.
CPC ................. *E04H 12/00* (2013.01); *F03D 11/04* (2013.01); *E04H 12/085* (2013.01); *F05D 2230/60* (2013.01); *F05D 2230/64* (2013.01); *F05D 2240/40* (2013.01)
USPC .................................... 52/40; 52/835; 52/848

(58) Field of Classification Search
CPC ......... E04B 1/34; E04B 1/3404; E04H 12/00; E04H 12/24; E04H 12/2292; E04C 3/30; F16D 1/033; F16D 1/076; F16D 25/243; F16B 5/02; F16L 23/032
USPC ........... 52/40, 651.01, 651.07, 834, 835, 843, 52/848, 849; 403/335–337
See application file for complete search history.

(56) References Cited

U.S. PATENT DOCUMENTS

| 5,544,857 | A | * | 8/1996 | Torrence ................... 251/129.15 |
| 8,196,358 | B2 | * | 6/2012 | Shiraishi ........................... 52/40 |
| 2006/0123735 | A1 | | 6/2006 | Fuellhaas et al. |
| 2009/0000227 | A1 | * | 1/2009 | Jakubowski et al. ......... 52/223.4 |
| 2010/0117353 | A1 | * | 5/2010 | Ma .................................... 285/64 |
| 2010/0126115 | A1 | * | 5/2010 | Lim et al. ......................... 52/848 |
| 2013/0180199 | A1 | * | 7/2013 | Vadlamudi et al. ......... 52/651.01 |

FOREIGN PATENT DOCUMENTS

| DE | 102005052419 | A1 | 8/2006 |
| EP | 1544460 | A2 | 6/2005 |

* cited by examiner

*Primary Examiner* — Brian Glessner
*Assistant Examiner* — Adam Barlow
(74) *Attorney, Agent, or Firm* — Schmeiser, Olsen & Watts LLP

(57) ABSTRACT

The invention describes a flange assistant for connecting adjacent tower sections, whereby each tower section comprises a tower section shell, a tower section flange, and a radius transition between the tower section shell and the tower section flange; wherein the flange assistant comprises an extension formed to complement the radius transition such that the flange assistant extends into a transition zone of a tower section. A tower section is disclosed for connecting adjacent tower sections, each comprising a tower section shell, a tower section flange, and a radius transition over a transition zone between the shell and flange, wherein the tower section connecting arrangement comprises at least one flange assistant and a number of fasteners to connect together the flanges and the flange assistants.

19 Claims, 5 Drawing Sheets

US 8,978,315 B2

FLANGE ASSISTANT FOR CONNECTING ADJACENT TOWER SECTIONS

CROSS-REFERENCE TO RELATED APPLICATIONS

This application claims priority to EP Application No. EP13155820.7, having a filing date of Feb. 19, 2013, the entire contents of which are hereby incorporated by reference.

FIELD OF TECHNOLOGY

The following describes a flange assistant for connecting adjacent tower sections, a tower section connecting arrangement, and a tower.

BACKGROUND

A tower of a tall structure such as a wind turbine can easily reach 115 m in height. Such a tower is usually constructed of a number of pre-fabricated tower sections which are transported to the onshore or offshore wind turbine site and assembled there. A tower section comprises an essentially cylindrical 'shell' that tapers slightly toward the top. A tower section is generally made of steel, and may have a length of 10-30 m or more, for which a typical diameter might be between 2.0 m and 7.0 m.

Ideally, tower sections would be connected vertically through their shell walls, so that any loading forces would be transferred directly from one shell to the next. However, this is not feasible, and the tower sections are usually connected by pairs of flanges. Generally, a flange is welded to the upper and lower ends of the tower section, depending on its position in the tower. The lower flange of one tower section is connected to the upper flange of a lower tower section, usually by bolts inserted through matching pairs of bores or through-holes in the flanges. To minimize stress in such a flange connection, the flanges are formed essentially at right angles to the shells. The bores are generally evenly spaced about the circumference of each flange in a 'bolt circle'. For optimal load transfer between the tower sections, the bolt circle diameter (BCD) should be as close as possible to the tower section diameter.

The tower sections must be transported horizontally from the manufacturing site to the wind turbine site. A problem arising during transport is that the weight of a tower section causes the shell and the flange to distort, and their ideal circular cross-sections may become oval, making it impossible to connect that tower section to one another. For this reason, a thick, robust flange may be attached to the tower section in order to ensure that the tower section retains its shape during transport. However, such a thick and rigid flange adds considerably to the costs of manufacture, especially since wind turbine towers are becoming larger, and is also associated with problems during tower assembly. For example, it is difficult to correct any misalignment of the bores owing to the inherent rigidity of the flange. Furthermore, should the thicker flange be in any way distorted during transport, such a distortion cannot be rectified, and the entire tower section must be scrapped.

A thinner or 'soft' flange, using less material, can considerably reduce the manufacturing costs of a tower. Such a 'thin' or 'soft' flange could be supported in some suitable manner during transport to avoid shell and flange distortion. However, a flange connection between tower sections using these thin or 'soft' flanges is less reliable compared to a flange connection using thick flanges. To improve the structural strength of a 'soft' flange, additional material is used in the transition area between the protruding horizontal flange and the vertical shell. Since the extra material exhibits a curved surface in the smooth transition from horizontal flange to vertical shell, it may be referred to as a 'radius transition'. While the radius transition can improve the strength of the flange, thus making it possible to decrease the tower section diameter and thereby reduce transportation costs, it is also associated with a number of disadvantages. A washer or nut requires a level contact surface at right angles to the bolt, so that the through-holes or bores for the bolts must be arranged at a considerable distance from such a radius transition. The region of the radius transition is essentially a 'forbidden' transition zone in which no bolts may be placed, so that the bolt circle diameter is constrained by the need to form the flange with such a radius transition. However, the stability of the flange connection between tower sections decreases with increasing distance between the bolts and the shell.

In one approach to this problem, the thin flange connection by be strengthened using additional flat ring segments fastened to the lower flange using the bolts, in order to decrease the stresses in the weld by decreasing the amount of deflection of the bottom flange. To be effective, such flat ring segments must be relatively thick and wide. Furthermore, their effectiveness is limited by having to place them outside of the radius transition between flange and shell. As a result, the shell may still suffer damage in the weld area.

SUMMARY

Described is an improved flange connection between tower sections that overcomes the problems described above.

A flange assistant for connecting adjacent tower sections whereby each tower section comprises a tower section shell, a tower section flange, and a radius transition between the tower section shell and the tower section flange; wherein the flange assistant comprises an extension formed to complement the radius transition such that the flange assistant extends into a transition zone of a tower section; by the tower section connecting arrangement for connecting adjacent tower sections, whereby a tower section comprises a tower section shell, a tower section flange, and a radius transition over a transition zone between the shell and flange, which connecting arrangement comprises at least one flange assistant comprising an extension formed to complement the radius transition of a tower section such that the flange assistant extends into the transition zone of that tower section; and a number of fasteners, mounted in corresponding bores formed in the flanges and the flange assistants, to connect together the flanges and the flange assistants and by the tower.

The flange assistant is realized for connecting adjacent tower sections that each comprise a tower section shell, a tower section flange, and a significant radius transition between the tower section shell and the tower section flange. The flange assistant comprises an extension formed to complement the radius transition such that the flange assistant extends into the transition zone of a tower section. The expression 'formed to complement the radius transition' is to be understood to mean that the flange assistant extension is formed to accommodate the radius transition in some way, and to make physical contact with the radius transition in some way. In other words, flange extension material can extend into the forbidden 'transition zone' that extends over the depth of the radius transition, and that was of necessity avoided by the flat ring segments of the known strengthening arrangements. In the context of the invention, the term "radius transition" is to be understood as a curved transition between two essentially perpendicular flange and shell wall, with a curvature defined by one or more radii.

An advantage of the flange assistant is it allows any flange fasteners—e.g. bolt, washer and nut—to be arranged closer to the shell wall, thus increasing the effectiveness of the flange in deflecting loading stresses away from the weld. Furthermore, since the extension accommodates the radius transition, a larger radius transition is possible, resulting in a reduction in the stresses that can act on the flange and/or weld. A flange may generally be made of a high-quality steel such as S355NL according to the manufacturing standard EN 10025-3, which is produced with fewer impurities and which is therefore more expensive. A 'thinner' flange, made with less material, is cheaper to manufacture and presents less problems during tower assembly. The flange assistant need not be made of such high-quality steel. Instead, a lower-grade material such as S355J2 and S355K2 according to the manufacturing standard EN 10025-2 can be used, which is significantly cheaper. The reduction in material thickness of the flange combined with a cheaper material quality for the flange assistant reduces the overall costs of the tower. A 'thin' flange is to be understood as a flange whose thickness does not exceed the thickness of the tower section shell by a significant amount. The thickness of a "thin" flange may be essentially the same as the thickness of the shell, and is generally not thinner than the shell.

The disclosed tower section connecting arrangement is realized for connecting adjacent tower sections, whereby each tower section comprises a tower section shell, a tower section flange, and a radius transition over a transition zone between the shell and flange of that tower section. The tower section connecting arrangement comprises at least one flange assistant comprising an extension formed to complement the radius transition such that the flange assistant extends into the transition zone of that tower section; and a number of fasteners, mounted in corresponding bores formed in the flanges and the flange assistants, to connect together the flanges and the flange assistants.

An advantage of the tower section connecting arrangement is that it is relatively straightforward and simple to make, while ensuring a favorable absorption of stresses or transfer of loads from the radius transition to the flange assistant. The lifetime of a tower can therefore be extended, since the likelihood of fatigue damage to the tower sections, particularly in the weld areas, is significantly reduced.

As disclosed, a tower comprises a plurality of tower sections, of which at least two adjacent tower sections are connected with one or more flange assistants according to the invention.

An advantage of the tower is that the radius transition of each flange can be made quite large, since the flange assistant can act to deflect any detrimental loading forces away from the flange/shell connection, i.e. away from the weld, so that the structural stability of the tower is favorably improved while its manufacturing costs are favorably reduced.

Particularly advantageous embodiments and features are given by the dependent claims, as revealed in the following description. Features of different claim categories may be combined as appropriate to give further embodiments not described herein.

In the following, without restricting the invention in any way, it may be assumed that the tower is a wind turbine tower, and that the tower sections pre-fabricated of steel. Furthermore, it may be assumed that a tower section comprises a shell with an essentially circular cross-section.

During operation of the wind turbine, the tower may oscillate or sway to a certain extent. The joints between tower sections must be able to withstand the loading stresses and to deflect these stresses from the inherently weaker weld area between shell and flange. The flange assistant according to the invention can ensure that this function is fulfilled, since the extension makes physical contact with the radius transition area and can therefore transfer stresses from the radius transition region into the flange assistant and from there to the flange, so that the flange can fulfill its function. In an embodiment of the flange assistant according to the invention, the extension comprises a curved edge surface, which curved edge surface is shaped to lie against the radius transition of a tower section. In this way, the useful surface area of the extension is maximized, and the functionality of the flange assistant is also maximized. The optimal transfer of load from the radius transition to the flange assistant also ensures that the loading on any fasteners connecting the flanges is also effectively reduced.

In a further particularly embodiment, the flange assistant extension is formed to make surface contact only with the surface of the radius transition. The remainder of the extension is shaped to avoid contact with any part of the tower section. In this way, the flange assistant extension makes contact at most to the curved surface of the radius transition. This ensures that the shell can bend or deflect relative to the flange (as it should) without any part of the shell wall making contact with the flange assistant, since that might otherwise result in damage to the shell wall or to the flange extension.

As indicated above, it is usual to manufacture the shell and flange separately, and to weld the shell to the flange. The process of welding results in a raised weld 'seam' about the circumference of the tower section. The weld seam may extend several millimeters beyond the surface of the shell. Therefore, in a further embodiment, the flange assistant extension comprises a recess dimensioned to accommodate such a weld seam between the shell and flange of a tower section. It is important that the flange assistant takes this excess weld metal into account since this is not removed in most cases, and is usually left as it is, as a 'bulge' on the inside and/or outside of the tower section close to the circular opening. Here also, the shape of the flange assistant ensures that no contact is made between the weld and the body of the flange assistant when the shell deflects relative to the flange.

The shape of the flange assistant essentially raises the contact surface of the fasteners above the flange surface, and allows this contact surface to be 'shifted' closer to the shell. To connect the flange assistant together with the flanges, the flange assistant also comprises a number of bores corresponding to bores in the tower section flanges. In a particularly embodiment, the flange assistant comprises at least one such bore formed relative to the extension such that a loading surface of a fastener arranged in that bore extends into the transition zone. The positions of the corresponding bores in the flanges are therefore governed by the shape of the flange assistant, and may be formed closer to the shell, so that the BCD of a tower section approaches the diameter of the shell. This is in clear contrast to the prior art arrangements, in which the bores in any strengthening ring segments were made according to the bores in the flanges, which in turn were required to be placed at a certain minimum distance from the radius transition, bringing the BCD further away from the shell diameter.

The dimensions of the flange assistant are determined according to its main purpose. For example, if it is only desired to increase the bolt circle diameter for an interior flange that already exhibits a satisfactory degree of stiffness, the flange assistant may be made relatively flat. In an embodiment, therefore, the thickness of the flange assistant is based on a depth of the radius transition of the flange to which it is mounted. Here, the thickness of the flange assistant does not need to exceed the depth of the radius transition, since no purpose would be served thereby.

Alternatively, it may be necessary to increase the stiffness of the flange connection while also improving the BCD, i.e. bringing this closer to the shell diameter. In this case, the flange assistant can be made quite thick, with a thickness well exceeding the depth or radius of the radius transition. In an embodiment, therefore, the thickness of the flange assistant is at least 100%, more preferably at least 120%, most preferably at least 140% of the thickness of the flange to which it is mounted. For example, a conventional flange may require a thickness of about 100 mm to provide the necessary stiffness for a certain tower section. That "thick" flange (expensive because of the requirement to use high-grade steel and problematic during tower assembly) can be replaced by a thinner flange in combination with a flange assistant according to the invention. In this case, the flange itself can be constructed with a thickness of only about 50 mm, and can be stiffened by a flange assistant (made of more economical low-grade steel) with a thickness of 50 mm. This is made possible by the combination of extension and recess that allows the flange assistant to obtain essentially any desired 'height' without encroaching into the transition zone near the weld. It follows that a thicker flange assistant increases the bolt length of the fasteners, also providing an increase in the connection strength. The actual flange thickness will depend to a large extent on the conditions to which the wind turbine tower will be exposed, and will therefore be determined by the wind turbine site, the loading that will be expected; and the weather conditions prevalent at that site.

To facilitate the mounting of the flange assistant during tower assembly, the flange assistant comprises a plurality of flange assistant sections. Each section can correspond to an arc or portion of an annular ring. The sections can be exactly machined to abut, giving a closed ring when all sections are in place, or some clearance may be allowed between adjacent segments. For a tower section connection with flange assistants above and below the flanges, the segments may be arranged in an offset manner. In this way, a more effective load distribution may be obtained. Alternatively, the segments arranged on the 'upper' flange may be aligned with those arranged on the 'lower' flange.

The position of the flanges relative to the shell, i.e. whether the flange is on the interior or on the exterior, may depend on the position of the tower section in the tower. A flange at the bottom of the tower may be formed on the exterior. Therefore, in an embodiment, the flange assistant is realized for connecting the exterior flanges of adjacent tower sections with a reduced BCD, i.e. with a BCD that is smaller than the BCD of a tower section connection made without such flange assistants. Such a flange assistant may comprise several arc pieces formed with an inner curved edge to meet the outwardly-facing radius transition of the exterior flange. A complete tower section connection may therefore use two flange assistants, one for the upper tower section and one for the lower tower section.

Equally, a flange at an intermediate level of the tower may be formed on the interior. Therefore, in another embodiment, the flange assistant is realized for connecting the interior flanges of adjacent tower sections with an increased BCD, i.e. with a BCD that is greater than the BCD of a tower section connection made without such flange assistants. Such a flange assistant may comprise several arc pieces formed with an outer curved edge to meet the inwardly-facing radius transition of the interior flange. Here also, a complete tower section connection may use two such flange assistants, one for the upper tower section and one for the lower tower section.

Of course, one end of tower section may have both an interior and an exterior flange, if desired, for example for the lowest section of an onshore wind turbine, to facilitate its connection to a concrete base. In this case, one each of the above described flange assistants may be used, one on either side of the shell.

The radius transition should comprise sufficient 'added material' to obtain a satisfactory stress absorption in the flange. The amount of "added material" is determined according to the stress or loading that is to be expected for that tower section. The added material is also distributed evenly between flange and shell wall to give a smooth concave transition, for example in the manner of a quarter circle or any other suitable curve type, e.g. a portion of an ellipse, parabola, etc., when viewed in cross-section. The size of a radius or other curve-defining parameter can be derived from the even distribution of the "added material". For example, in the case of an exemplary tower section, the flange thickness may be 60 mm, the wall thickness of the tower section may be 20 mm, and the added material can be distributed as a smooth concave transition between flange and shell, with an average radius of 15.0 mm. In an embodiment, therefore, a radius of the curved edge surface of the flange assistant extension comprises at least 13.0 mm, more preferably at least 14.0 mm, most preferably at least 15.0 mm, depending on the radius in the transition area of the flange to which that flange assistant is to be mounted.

It is conceivable to realize the flange assistant so that the bores for the fasteners are arranged directly beside the radius transition, bring the BCD as close as possible to the shell. However, this would mean that the bolt head or nut is very close to the shell wall. This may make it difficult to tighten such a fastener. Therefore, in an embodiment, the placement of a bore in the flange assistant (and therefore also the flange) is determined on the basis of a minimum tool clearance.

A wind turbine tower constructed using the type of tower section connection described above with the flange assistant may be characterized by very favorable BCDs, wherein the bolt circle diameter of an exterior flange of a tower section connected thus comprises at most 105%, more preferably at most 104.5%, most preferably at most 104% of the tower section diameter, and the bolt circle diameter of an interior flange of a tower section connected thus comprises at least 94.8%, more preferably at least 95%, most preferably at least 95.4% of the tower section diameter. Of course, the actual bolt circle diameter will be governed by the tower section dimensions, which in turn are determined by the site for which the turbine is intended, and the expected loads. For example, for a tower section with a shell diameter of 5000 mm, the bolts of a flange connection are effectively shifted toward the shell by about 40 mm. Being able to place the bolts closer to the shell body results in an improved load-absorbing performance of the flange and can considerably prolong the lifetime of the tower.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention, wherein.

In the diagrams, like numbers refer to like objects throughout. Objects in the diagrams are not necessarily drawn to scale.

DETAILED DESCRIPTION

Figure 1:
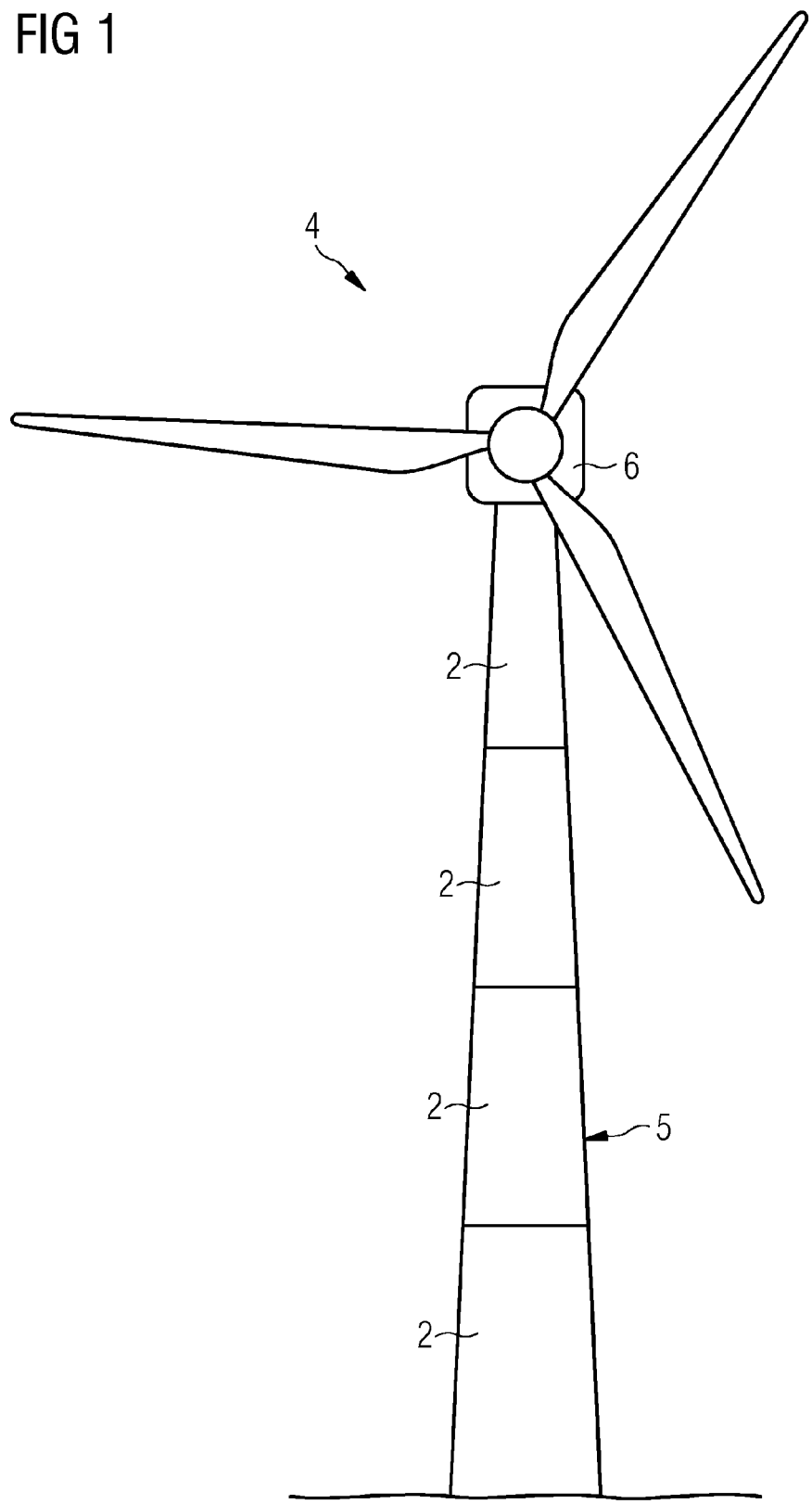
FIG. 1 shows a wind turbine.

FIG. 1 shows a wind turbine 4 of a usual construction. A nacelle 6 is supported by a tower 5. The tower 5 is made by stacking tower sections 2 one on top of the other to reach the desired height. As the diagram indicates, the tower 5 is usually widest at the bottom and tapers gradually towards the nacelle. The tower sections 2 are therefore also tapered accordingly. Adjacent tower sections 2 must be firmly secured to each other. To this end, a tower section will have an interior and/or an exterior flange at its upper and/or lower edges (depending on its position in the tower), to match the flange(s) of one or two adjacent tower sections.

Figure 2:
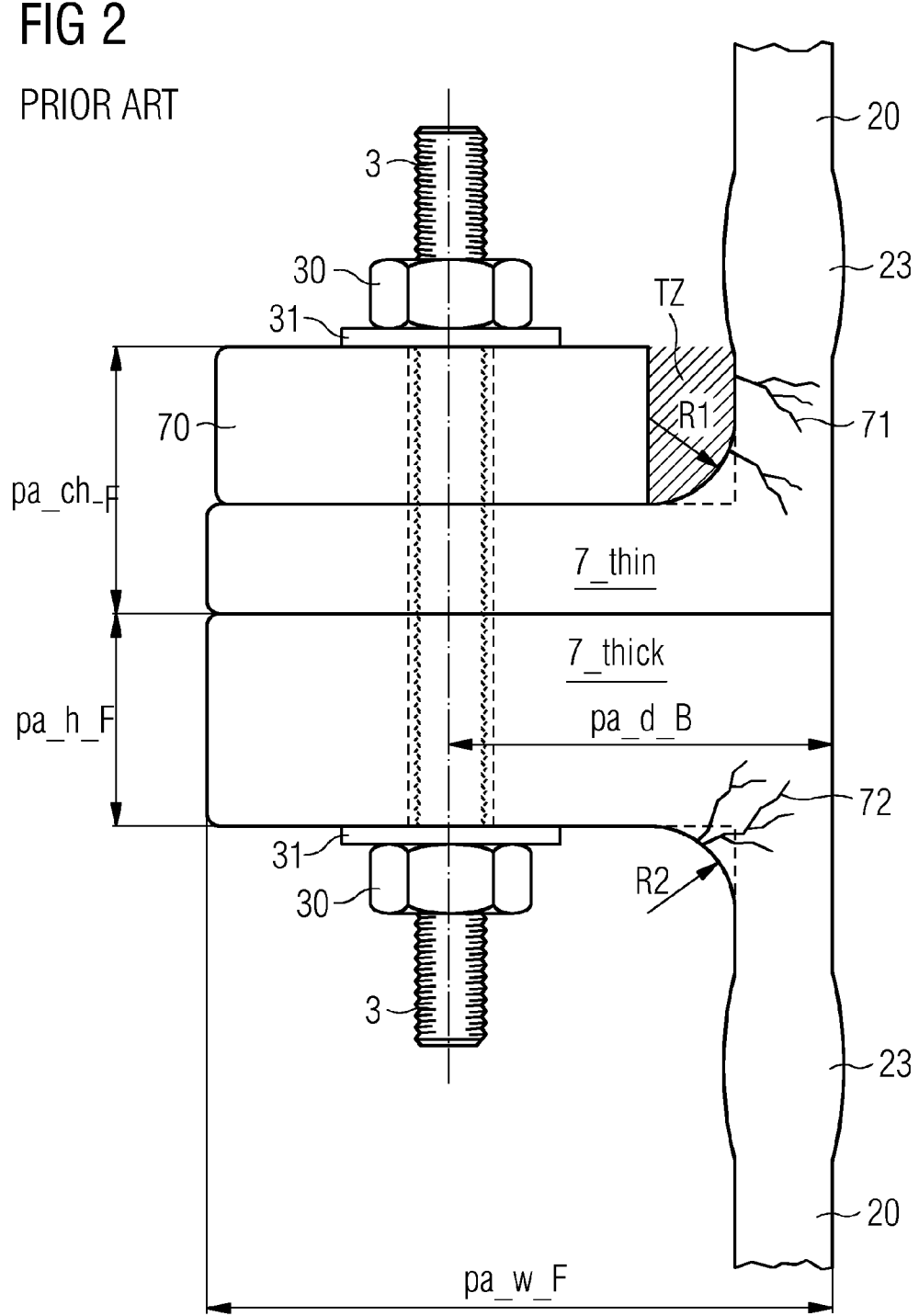
FIG. 2 shows a prior art tower section connection arrangement.

FIG. 2 shows a prior art connection arrangement for the sections of a wind turbine tower. Here, the problems with the prior art constructions are illustrated using two different flange configurations, although it is usual to use the same configuration for both tower sections 2.

The upper part of the diagram shows a tower section 2 with a shell 20 welded to a flange 7_thin, leaving a raised weld seam 23. To strengthen the connection so that the flange 7_thin retains its shape during transport, the flange 7_thin is formed with a relatively voluminous radius transition R1. However, the depth of the resulting forbidden transition zone TZ (indicated by the hatched area) defines the position of a strengthening element 70, so that a noticeable gap remains between the strengthening element and vertical shell section. This can ultimately lead to fatigue damage 71 as a result of the limited inability of the flange connection to absorb sideways loading of the shell. In other words, the combined height pa_chF of the flange 7_thin and strengthening element 70 is not used effectively. Furthermore, the bolt position is dictated by the radius of the radius transition R1, so that a minimum bolt distance pa_dB between bolt and shell is required.

The lower part of the diagram shows a tower section 2 with a shell 20 welded to a thicker flange 7_thick. This flange 7_thick, because of its inherent rigidity on account of its thickness pa_hF, can be formed with a correspondingly smaller transition radius R2. However, this construction can ultimately lead to fatigue damage 71 as a result of the limited inability of the flange 7_thick to absorb sideways loading of the shell 20.

Figure 3:
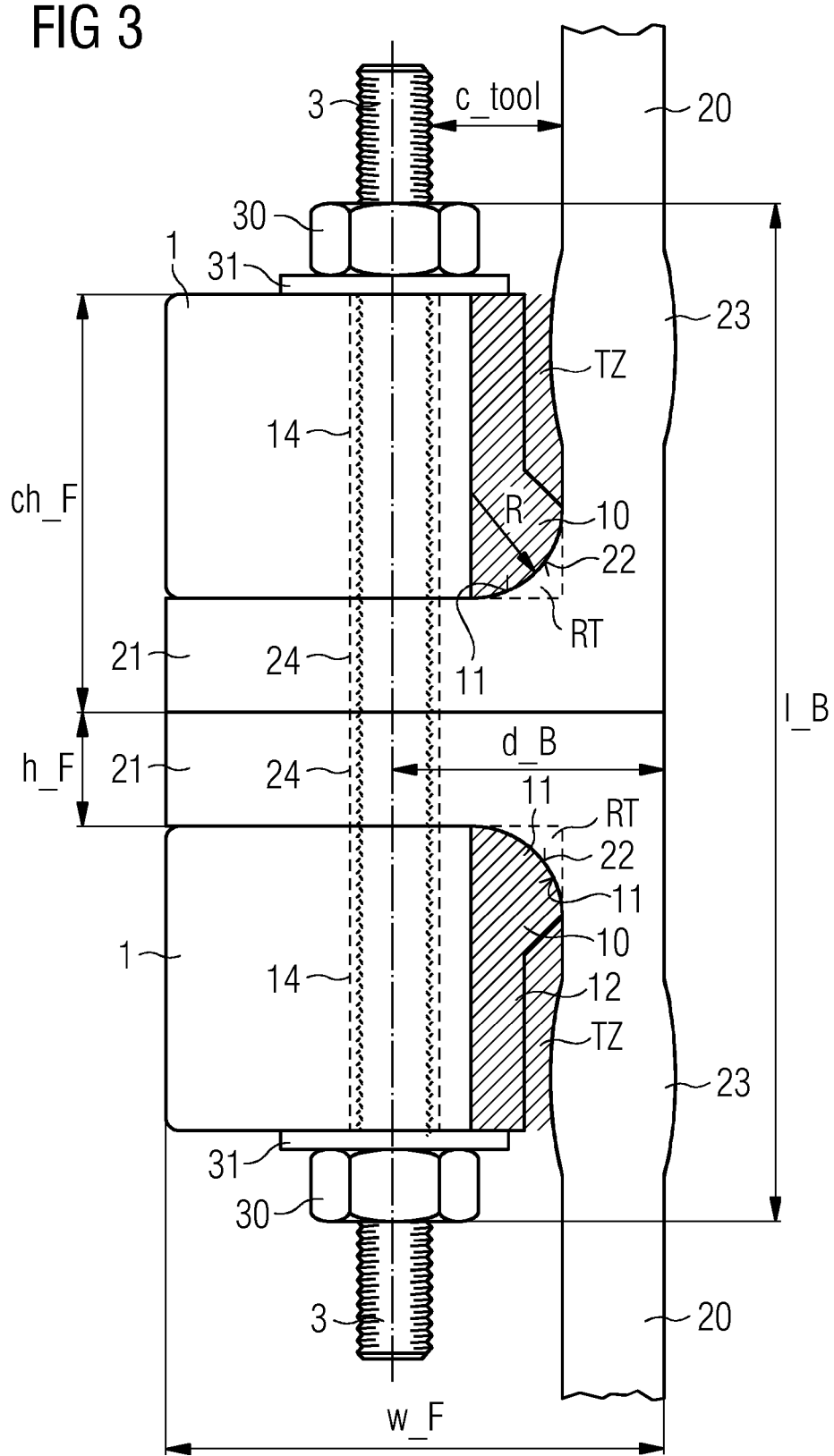
FIG. 3 shows an embodiment of a tower section connecting arrangement.

FIG. 3 shows an embodiment of a tower section connecting arrangement. Here, two tower sections 2 are joined using two flange assistants 1. The 'soft' flanges 21 are formed using a relatively thin construction. Structural stability is ensured by forming a thick radius transition RT using additional material in the 'corner' between flange and shell. This radius transition RT can have a relatively large radius R, so that the radius transition RT extends over an inwardly curved surface 22 between shell portion 20 and flange 21. To overcome the problems of unfavorable BCD, the flange assistant 1 according to the invention is shaped to complement the shape of the radius transition RT. To this end, the flange assistant 1 comprises an extension 10 with a curved edge surface 11 that closely matches the radius transition surface 22. In this way, the flange assistant 1 can extend into the 'forbidden' transition zone TZ and make surface contact over essentially the entire radius transition RT. This is in contrast to prior art flange strengthening elements, which must stop short of any such radius transition. The flange extension 10 is formed to only make surface contact over the radius transition RT, and not to make contact with the shell wall. To this end, the flange assistant 1 comprises a recess 12 that extends away from the shell wall. This construction avoids any unfavorable deformation of the shell as the tower oscillates during operation of the wind turbine or as a result of high winds. The recess 12 also ensures that the flange assistant 1 can fit over any weld seam 23 between flange 21 and shell 20. Bolts 3 can be inserted through corresponding bores 14, 24 in the flange assistants 1 and flanges 21 respectively. To secure the flange assistants 1 and flanges 21 together, nuts 30 can be tightened at either end. For optimal load absorption, washers 31 are arranged between nut 30 and flange assistant 1. Of course, a bolt with bolthead and single nut can be used instead.

The embodiment shown has various advantages over the prior art connections. Most advantageously, the position of a bolt 3 can be brought closer to the shell 20, i.e. a short bolt distance d_B is feasible. The load bearing surface of the fastener, usually a washer 31, can be brought closer to the shell 20, even though it is positioned above the curved radius transition RT. The load absorption through the matching curved contact surfaces 11, 22 can be further increased, if desired, by increasing the thickness of the flange assistant 1 and using correspondingly long bolts 3, indicated by the bolt length l_B. In this way, the increased overall connection height ch_F of the rigid flange connection can be configured to more effectively absorb the loads arising when the tower oscillates. The tower section connecting arrangement according to the invention allows a shorter flange width w_F, thus reducing the flange material costs. The flanges 21 can also be made with a relatively thin flange height h_F, reducing the material costs further.

Figure 4:
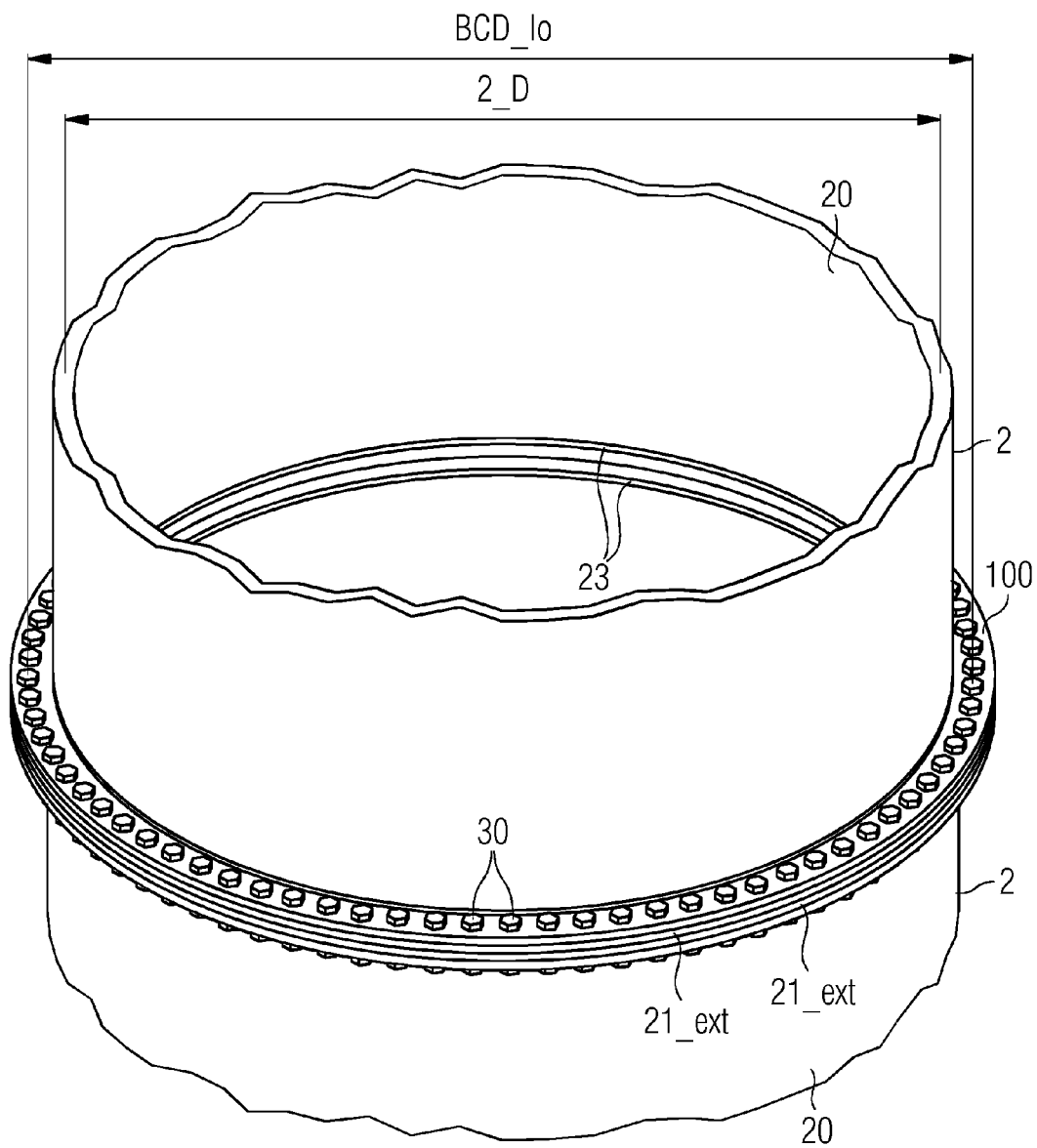
FIG. 4 shows an embodiment of a flange assistant for mounting to an exterior flange.

FIG. 4 shows an embodiment of a flange assistant 1 according to the invention for mounting to an exterior flange 21_ext of a tower shell section 20 with a shell diameter 2_D. The diagram shows two flange assistants 1 secured to a pair of exterior flanges 21_ext. In this embodiment, the flange assistant 1 comprises a number of sections 100 or segments 100 arranged about the circumference of the shell section 20. In this embodiment, the sections 100 are shaped to abut closely to give an overall closed ring, and the sections 100 are aligned above and below the flange connection.

Figure 5:
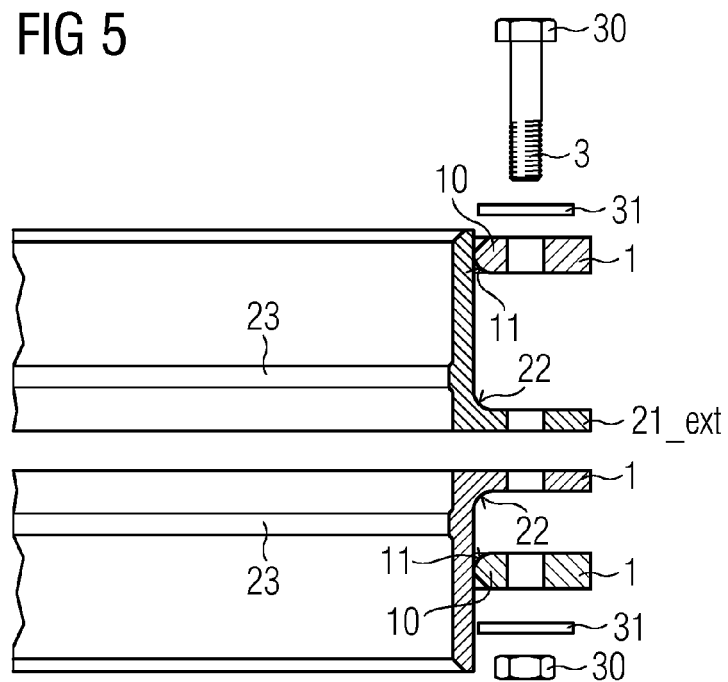
FIG. 5 shows a cross-section in an exploded rendering of the elements of FIG. 4.

FIG. 5 shows a cross-section in an exploded rendering of the elements of FIG. 4. The diagram shows a flange assistant 1 dimensioned to reduce the BCD of the flanges 21_ext. This is achieved by the extension 10, which can fit against the radius transition. This design of the flange extension and the resulting improved load transfer make a thinner flange possible, while also allowing the bores for the bolts 3 to be moved closer to the shell 20, so that a reduced BCD is achieved. This in turn makes it possible to construct a more slender and economical tower with narrower tower sections 2.

Figure 6:
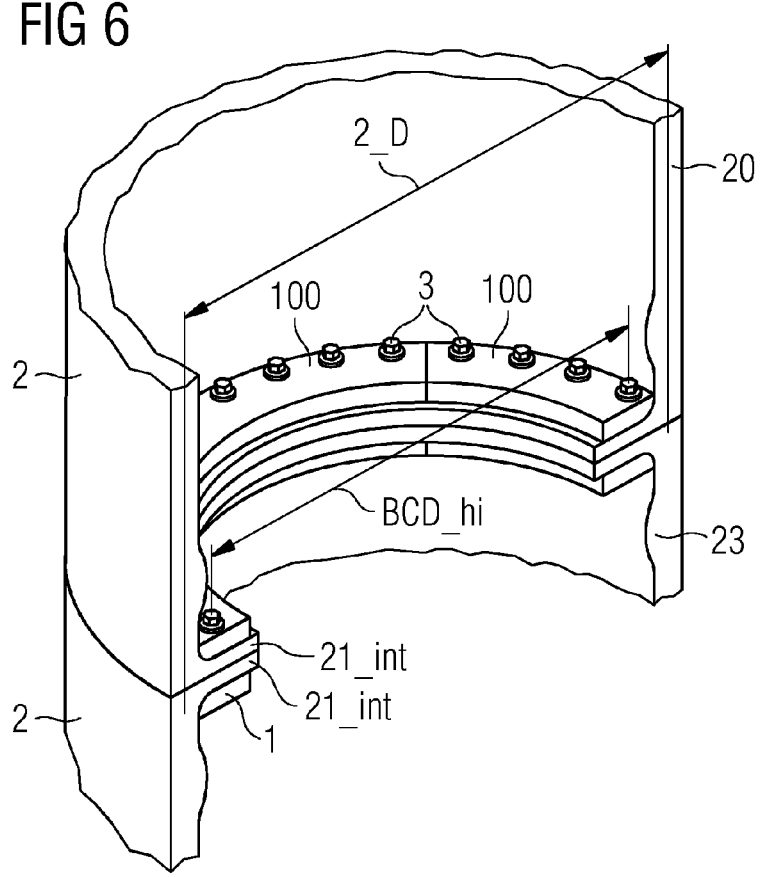
FIG. 6 shows an embodiment of a flange assistant for mounting to an interior flange.

FIG. 6 shows an embodiment of a flange assistant 1 according to the invention for mounting to an interior flange 21_int. Here, the effect of the flange assistant 1 is to increase the BCD, since the bores for the bolts 3 can be made closer to the shell 20, analogously to the explanations in FIGS. 4 and 5 above.

Although the present invention has been disclosed in the form of preferred embodiments and variations thereon, it will be understood that numerous additional modifications and variations could be made thereto without departing from the scope of the invention. For the sake of clarity, it is to be understood that the use of 'a' or 'an' throughout this application does not exclude a plurality, and 'comprising' does not exclude other steps or elements.

The invention claimed is:

1. A flange assistant connecting adjacent tower sections, whereby each tower section comprises:
a tower section shell, a tower section flange, and a radius transition between the tower section shell and the tower section flange;
wherein the flange assistant comprises:
an extension protruding from the flange assistant, the extension complementing the radius transition such that the flange assistant extends into a transition zone of the tower section, and
a recessed surface resulting in a gap between the flange assistant and the tower section shell.

2. The flange assistant according to claim 1, wherein the extension comprises a curved edge surface, the curved edge surface is shaped to lie against the radius transition of the tower section.

3. The flange assistant according to claim 1, wherein the gap between the flange assistant and the tower section provides clearance for a weld seam between the tower section shell and the tower section flange of the tower section.

4. The flange assistant according to claim 1, wherein the extension makes surface contact only with a surface of the radius transition.

5. The flange assistant according to claim 1, wherein the flange assistant comprises a number of bores corresponding to bores in the tower section flanges, whereby at least one such flange assistant bore is formed such that a fastener arranged in that bore extends into the transition zone.

6. The flange assistant according to claim 1, configured for connecting exterior flanges of adjacent tower sections with a reduced bolt circle diameter with respect to a bolt circle diameter of the tower section connection without the flange assistant.

7. The flange assistant according to claim 1, configured for connecting interior flanges of adjacent tower sections with an increased bolt circle diameter with respect to a bolt circle diameter of the tower section connection without the flange assistant.

8. The flange assistant according to claim 1, wherein a thickness of the flange assistant comprises at least 100% of the thickness of the flange to which it is mounted.

9. The flange assistant according to claim 1, comprising a plurality of flange assistant sections.

10. A tower section connecting arrangement connecting adjacent tower sections, whereby a tower section comprises a tower section shell, a tower section flange, and a radius transition over a transition zone between the tower section shell and the tower section flange, the connecting arrangement comprising:
at least one flange assistant comprising an extension protruding from the at least one flange assistant, the extension complementing the radius transition of the tower section such that the at least one flange assistant extends into the transition zone of the tower section;
a first number of bores formed through the at least one flange assistant and a second number of bores formed through the tower section flange, the first number of bores and the second number of bores each configured to accept a fastener that passes through both the at least one flange assistant and the tower section flange through the first number of bores and the second number of bore; and
a gap located between the at least one flange assistant and the tower section shell.

11. The tower section connecting arrangement according to claim 10, wherein the extension of the at least one flange assistant comprises a curved edge surface with a radius corresponding to a depth of the transition zone of the tower section flange to which the at least one flange assistant is mounted.

12. The tower section connecting arrangement according to claim 10, wherein a placement of a bore of the first number of bores in the at least one flange assistant is determined on the basis of a minimum tool clearance.

13. A tower comprising a plurality of tower sections, of which at least two adjacent tower sections of the plurality of tower sections are connected with one or more flange assistants of claim 1.

14. The tower according to claim 13, comprising pairs of interior flanges and/or pairs of exterior flanges.

15. The tower according to claim 13, wherein a bolt circle diameter of an exterior flange of the tower section connected comprises at most 105.0% of a tower section diameter, and a bolt circle diameter of an interior flange of the tower section connected comprises at least 94.8% of the tower section diameter.

16. The flange assistant according to claim 1, wherein a thickness of the flange assistant comprises at least 120% of a thickness of the flange to which the flange assistant is mounted.

17. The flange assistant according to claim 1, wherein a thickness of the flange assistant comprises at least 140% of a thickness of the flange to which the flange assistant is mounted.

18. The tower according to claim 13, wherein a bolt circle diameter of an exterior flange of the tower section connected comprises at most 104.5% of a tower section diameter, and a bolt circle diameter of an interior flange of tower section connected comprises at least 95.0% of the tower section diameter.

19. The tower according to claim 13, wherein a bolt circle diameter of an exterior flange of the tower section connected comprises at most 104% of a tower section diameter, and a bolt circle diameter of an interior flange of the tower section connected comprises at least 95.4% of the tower section diameter.

* * * * *

UNITED STATES PATENT AND TRADEMARK OFFICE
CERTIFICATE OF CORRECTION

PATENT NO. : 8,978,315 B2  Page 1 of 1
APPLICATION NO. : 14/143054
DATED : March 17, 2015
INVENTOR(S) : Johnny Steven Lam It is certified that error appears in the above-identified patent and that said Letters Patent is hereby corrected as shown below:

In the Claims,

Column 10, line 11, delete "bore" and insert -- bores --

Signed and Sealed this
Twenty-fifth Day of August, 2015

Michelle K. Lee
*Director of the United States Patent and Trademark Office*